United States Patent [19]

Okonsky et al.

[11] Patent Number: 5,379,183
[45] Date of Patent: Jan. 3, 1995

[54] COMBINATION I/O PLATE/LID HINGE STRUCTURE FOR A NOTEBOOK COMPUTER

[75] Inventors: Christian Okonsky; David Lunsord, both of Austin, Tex.

[73] Assignee: Dell USA, L.P., Austin, Tex.

[21] Appl. No.: 54,503

[22] Filed: Apr. 27, 1993

[51] Int. Cl.⁶ ............................ H05K 7/16; G06F 1/16
[52] U.S. Cl. ........................................ 361/681; 16/342
[58] Field of Search .................. 16/223, 337, 342; 248/917–923; 364/708.1; 361/680–686; 312/223.2

[56] References Cited

U.S. PATENT DOCUMENTS 5,001,659  3/1991  Watabe ............................ 361/681
5,199,888  4/1993  Condra et al. ................. 361/683 X Primary Examiner—Michael W. Phillips
Attorney, Agent, or Firm—J. Richard Konneker; James Huffman

[57] ABSTRACT

The lid portion of a notebook computer is pivotally secured to the base portion of the computer using a metal hinge structure directly interconnected between the lid portion and the metal I/O plate disposed at the back side of the computer base portion and grounded to the system planar board therein. A direct grounding connection is thus formed from the lid portion to the system planar board through this combination I/O plate/lid hinge structure.

14 Claims, 5 Drawing Sheets

COMBINATION I/O PLATE/LID HINGE STRUCTURE FOR A NOTEBOOK COMPUTER

BACKGROUND OF THE INVENTION

The present invention relates generally to computer apparatus, and, in a preferred embodiment thereof, more particularly relates to hinge structures used to pivotally connect the lid portion of a notebook computer to the base portion thereof.

As conventionally constructed, a notebook computer typically comprises a plastic housing having a base portion in which various of the computer operating components, such as the system planar board, are disposed, and a lid portion which carries on its inner side the display screen of the computer. The lid portion, in which the electrical display components are housed, is pivotable between a closed position in which the lid overlies a keyboard carried on the top side of the computer base portion, and an open position in which the keyboard is exposed and the display screen is generally perpendicular to the top side of the base portion and faces the computer user.

The hinge structure that pivotally interconnects the lid and base portions of the computer is normally anchored to plastic housing portions of the computer base and lid at suitable locations thereon. This conventional pivotal interconnection of the lid and base portions of a notebook computer carries with it several well known problems, limitations and disadvantages.

For example, to facilitate the retention of the opened lid in a selected pivotal orientation relative to the base (i.e., to keep the opened lid from simply falling shut) the hinge is typically designed to provide a fairly high degree of frictional resistance to pivotal movement of the lid relative to the base. Accordingly, a correspondingly high degree of torque must be exerted on the lid to move it between its opened and closed positions. This relatively high degree of torque is transmitted to the plastic base portion housing to which the hinge structure is anchored—typically by a plurality of mounting screws. Over time, this torque borne by the plastic base housing portion can tend to cause the hinge mounting screws to work loose and/or crack the plastic.

This conventional hinge structure also tends to be relatively large in a base-to-lid direction, thereby presenting a limiting factor with respect to how thin the overall computer can be. Since minimal size has become a key design criteria in the notebook computer arena, this characteristic of conventional lid hinge structures is decidedly undesirable.

Another disadvantage of conventional notebook computer lid hinges of this type is that due to the fact that they are directly interconnected between the plastic lid and base housing portions a separate grounding connection must be made between the lid and housings to ground the lid (and the electronic components therein) to the electronic components within the housing base portion. This requirement, of course, undesirably increases the overall fabrication cost of the computer.

In view of the foregoing it can readily be seen that a need exists for an improved hinge structure for pivotally interconnecting the lid and base portions of a notebook computer in a manner eliminating or at least substantially minimizing the above-mentioned problems, limitations and disadvantages commonly associated with conventional lid hinge structures. It is accordingly an object of the present invention to provide such an improved hinge structure.

SUMMARY OF THE INVENTION

In carrying out principles of the present invention, in accordance with a preferred embodiment thereof, a portable computer, representatively a notebook computer, has a base portion having disposed therein a system planar board, an I/O plate member fixedly secured to the base portion, and a lid portion. Hinge means are directly interconnected between the lid portion and the base portion and secure the lid portion to the base portion for pivotal movement relative thereto between closed and open positions in which the lid portion respectively covers and uncovers the top side of the base portion. According to a key aspect of the present invention, the lid portion is electrically grounded to the system planar board through the hinge means and the I/O plate member.

Compared to the conventional practice of securing a separate hinge structure to the base portion of the computer, the unique use of this combination I/O plate/lid hinge structure provides several advantages. First, the incorporation of the hinge structure on the I/O plate provides a direct grounding path from the lid portion through the I/O plate to the system planar board without the previous necessity of providing separate grounding connection from the lid portion to the planar board. Second, because the hinge structure is connected directly to the I/O plate instead of to the plastic housing part of the computer base portion, a considerably stronger and more durable support is provided for the hinge structure. Third, the direct connection of the hinge structure to the I/O plate permits the vertical height of the overall hinge apparatus to be shorter than conventional hinge apparatus, thereby permitting the vertical thickness of the computer, in its closed orientation, to be desirably reduced.

In a preferred embodiment of the combination I/O plate/lid hinge structure, the I/O plate has a rearwardly bent tab portion formed on a top side edge thereof, and a metal mounting structure is fixedly clamped to the tab. The mounting structure pivotally supports a first end portion of a metal hinge pin member having a flattened second end portion that is anchored to a rear side edge section of the lid portion.

DETAILED DESCRIPTION

Figure 1:
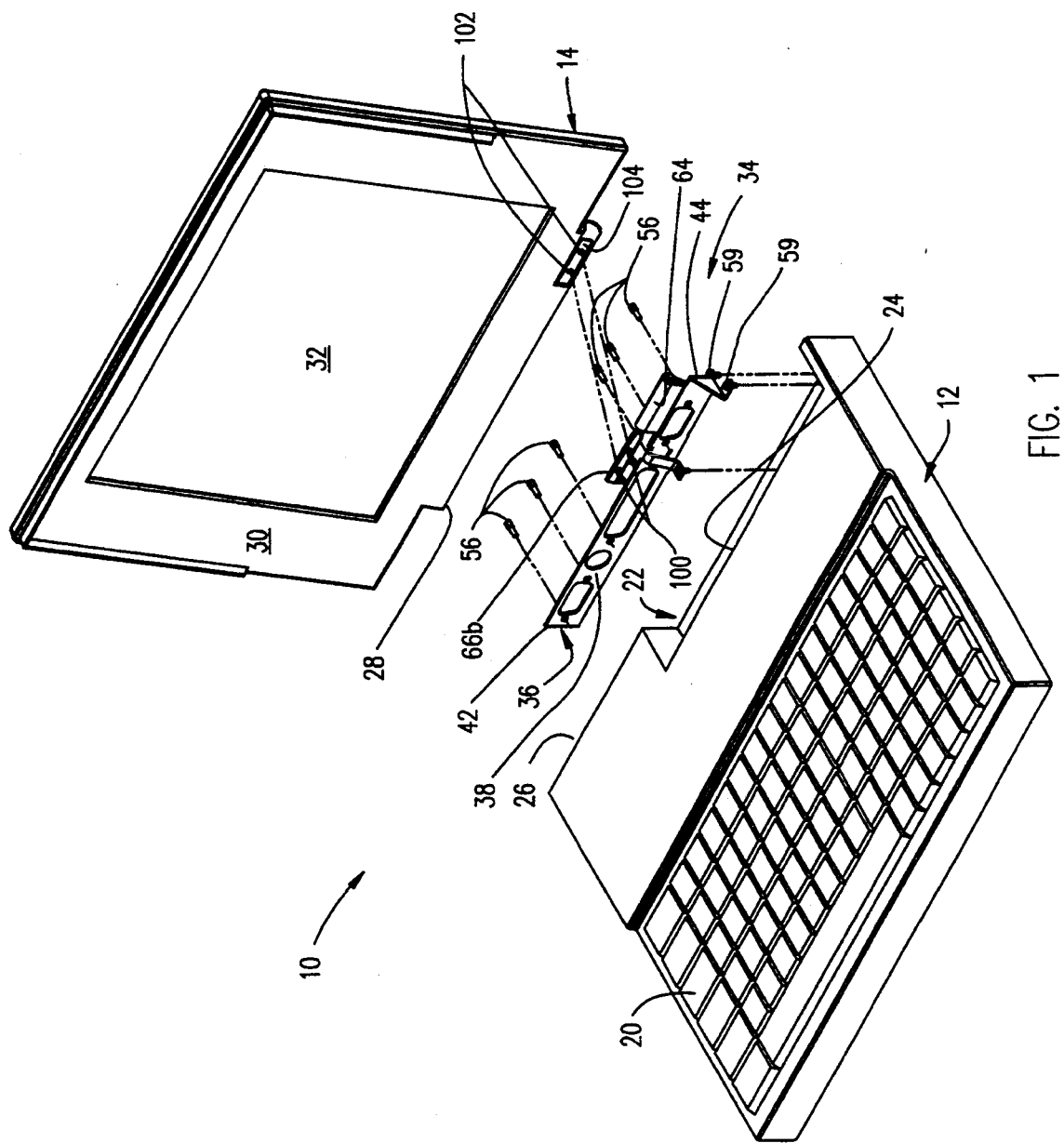
FIG. 1 is an exploded, somewhat simplified front side perspective view of a representative notebook computer incorporating therein a specially designed combination I/O plate/lid hinge structure embodying principles of the present invention.
Figure 2:
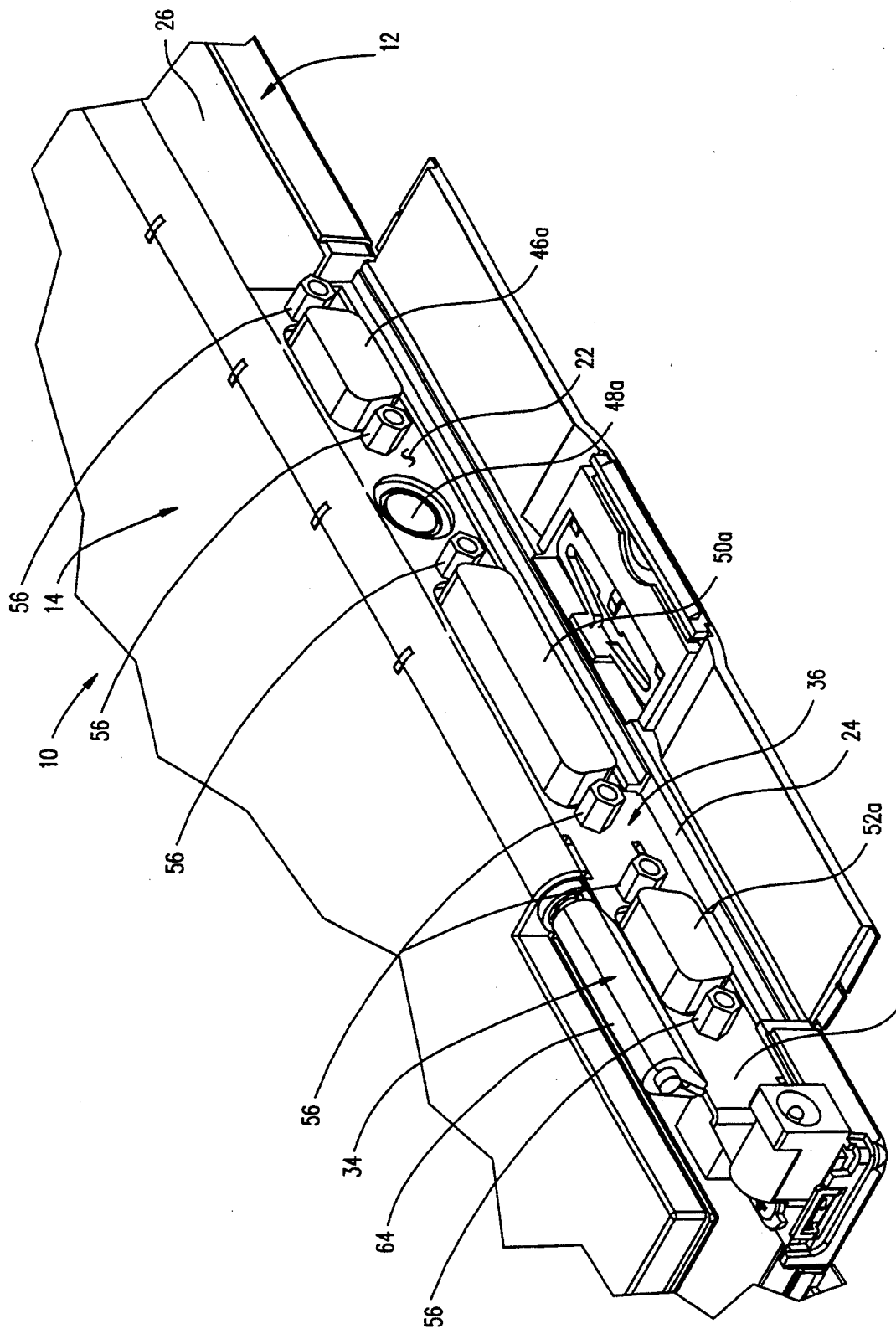
FIG. 2 is an enlarged scale perspective view of a rear side portion of the computer with its lid closed.

Perspectively illustrated in FIGS. 1 and 2 is a representative notebook computer 10 having a rectangular plastic base housing portion 12 and a rectangular plastic lid housing 14. Disposed within the base housing portion 12, above a lower side wall 16 thereof (see FIG. 4), are various electrical components of the computer, including a system planar board 18, and a keyboard 20 is carried on the top side of the base housing portion 12. For purposes later described, an elongated rectangular notch 22, having a bottom wall 24, is formed in the top side of the base housing 12 along its rear side 26.

The lid housing 14 has a rear side edge portion 28 and an inner side 30. A display screen 32 is disposed on the inner side 30 and has associated therewith various electronic components (not visible) disposed within the lid housing 14. Lid housing 14 is pivotally secured to the base housing 12 by means of a specially designed combination I/O plate/lid hinge structure 34 that embodies principles of the present invention. The lid housing is pivotable relative to the base housing between an upwardly pivoted open position (FIG.1) in which the lid housing is generally perpendicular to the base housing and exposes the keyboard 20 and the screen 32 to the computer user, and a downwardly pivoted closed position (FIG. 2) in which the lid housing 14 is parallel to the base housing 12 and covers the keyboard 20.

Figure 3:
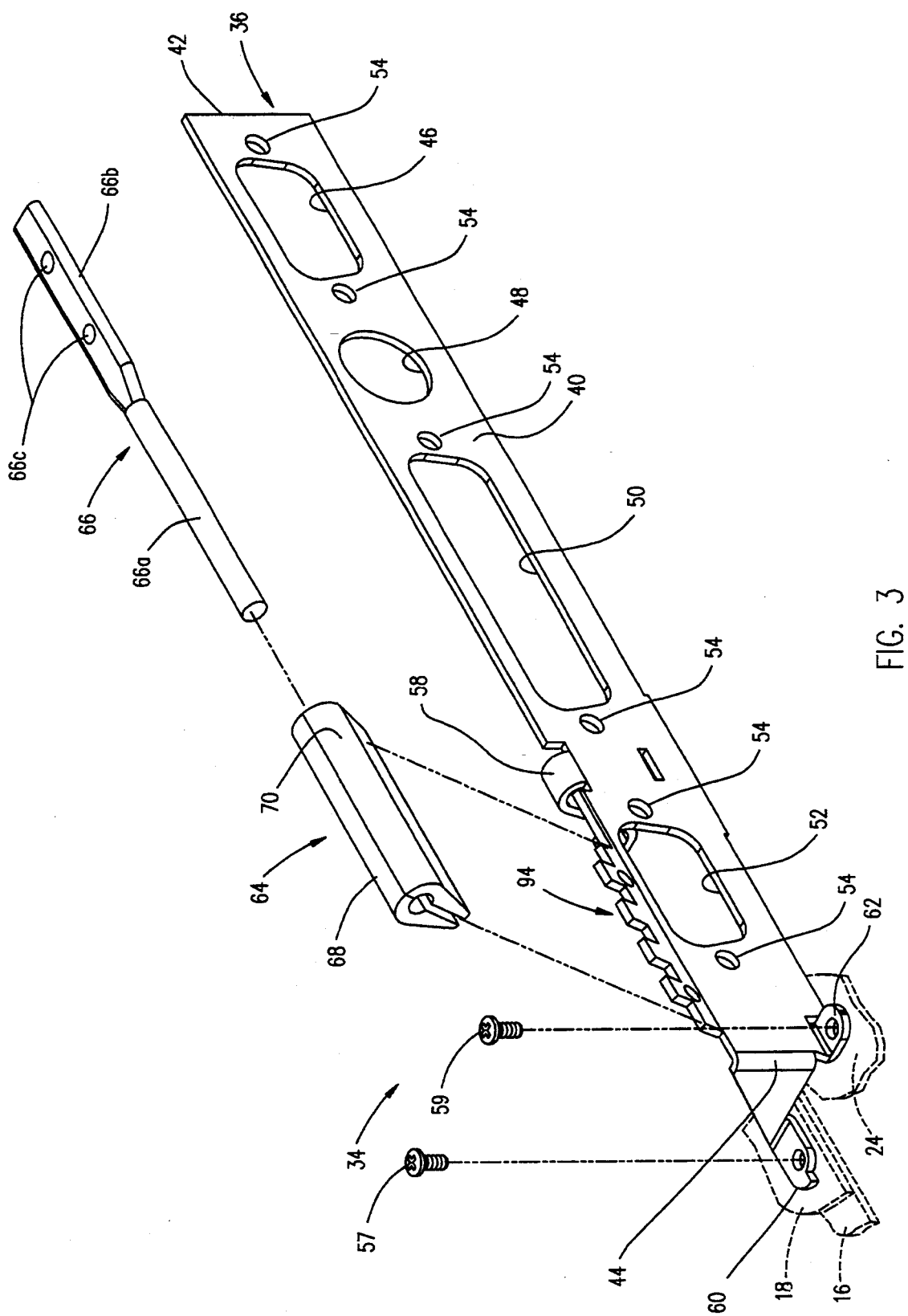
FIG. 3 is an enlarged scale, partially exploded rear side perspective view of the I/O plate/lid hinge structure.
Figure 4:
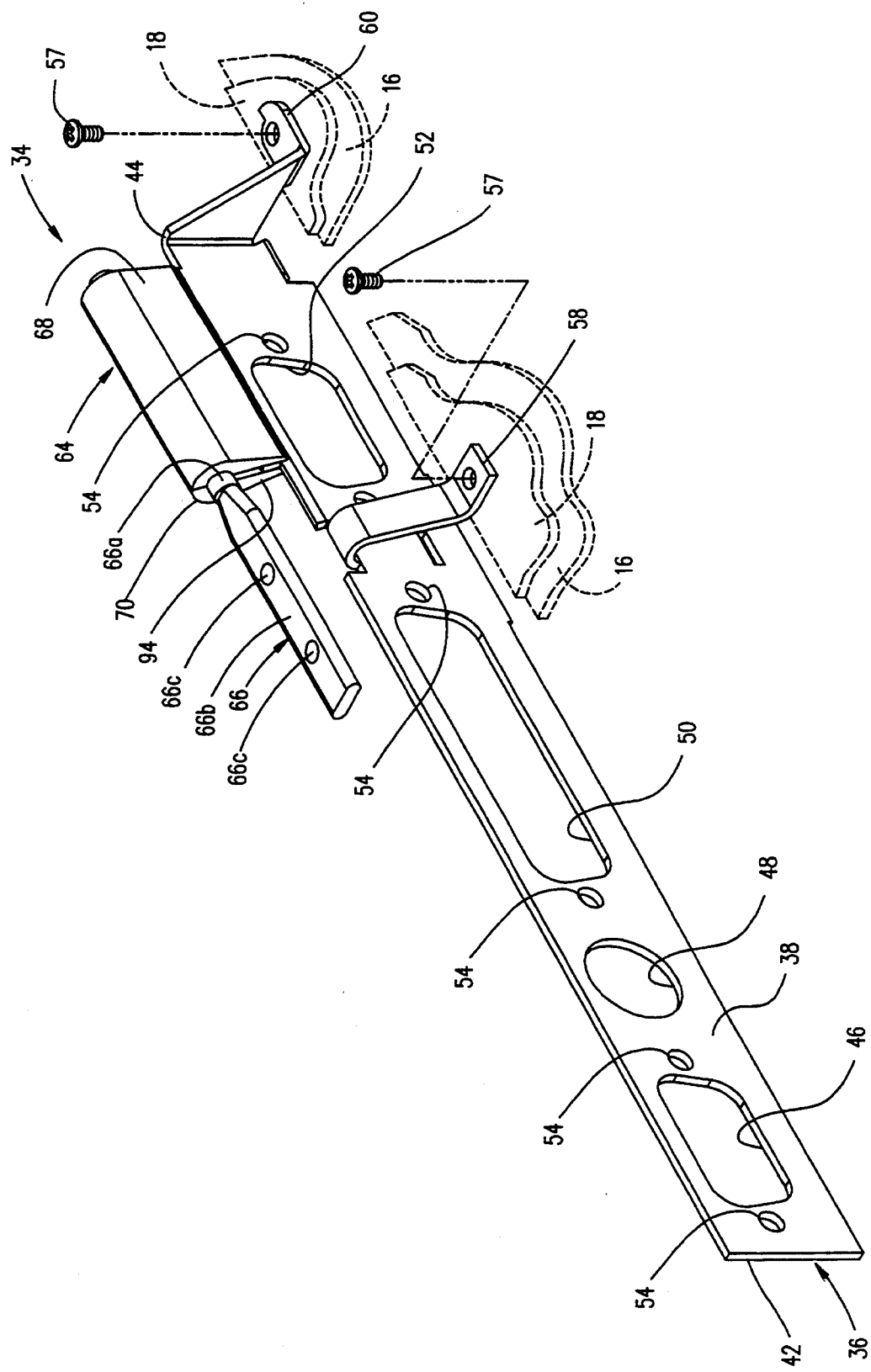
FIG. 4 is an enlarged scale front side perspective view of the I/O plate/lid hinge structure in its assembled state.

Referring now to FIGS. 1-4, the combination I/O plate/lid hinge structure 34 includes a horizontally elongated rectangular metal I/O plate 36 having front and rear sides 38 and 40 and opposite ends 42 and 44. As best illustrated in FIGS. 3 and 4, cutout areas 46-52, and circular mounting holes 54, are formed through the I/O plate 36. The I/O plate 36 is positioned forwardly within the top side notch 22 of the base housing 12, with the cutout areas 46-52 respectively receiving rearwardly projecting portions of I/O connector devices 46a-52a (see FIG. 2) mounted on the system planar board 18 (see FIG. 4) disposed within the base housing 12.

Screws 56 are extended through the I/O plate mounting holes 54 and threaded into the I/O connector devices 46a,50a and 52a, thereby grounding the metal I/O plate 36 to the system planar board 18. I/O plate 36 is also grounded to the planar board by screws 57 (see FIG. 4) extended downwardly through mounting tabs 58 and 60 formed on the front side of the I/O plate, through the planar board 18, and threaded into the lower side wall 16 of the base housing 12. The I/O plate 36 is also secured to the base housing 12 by a screw 59 (see FIG. 3) extended downwardly through a mounting tab 62 formed on end 44 of the I/O plate 36 and threaded into the bottom wall 24 of the notched area 22 of the base housing 12.

Figure 5:
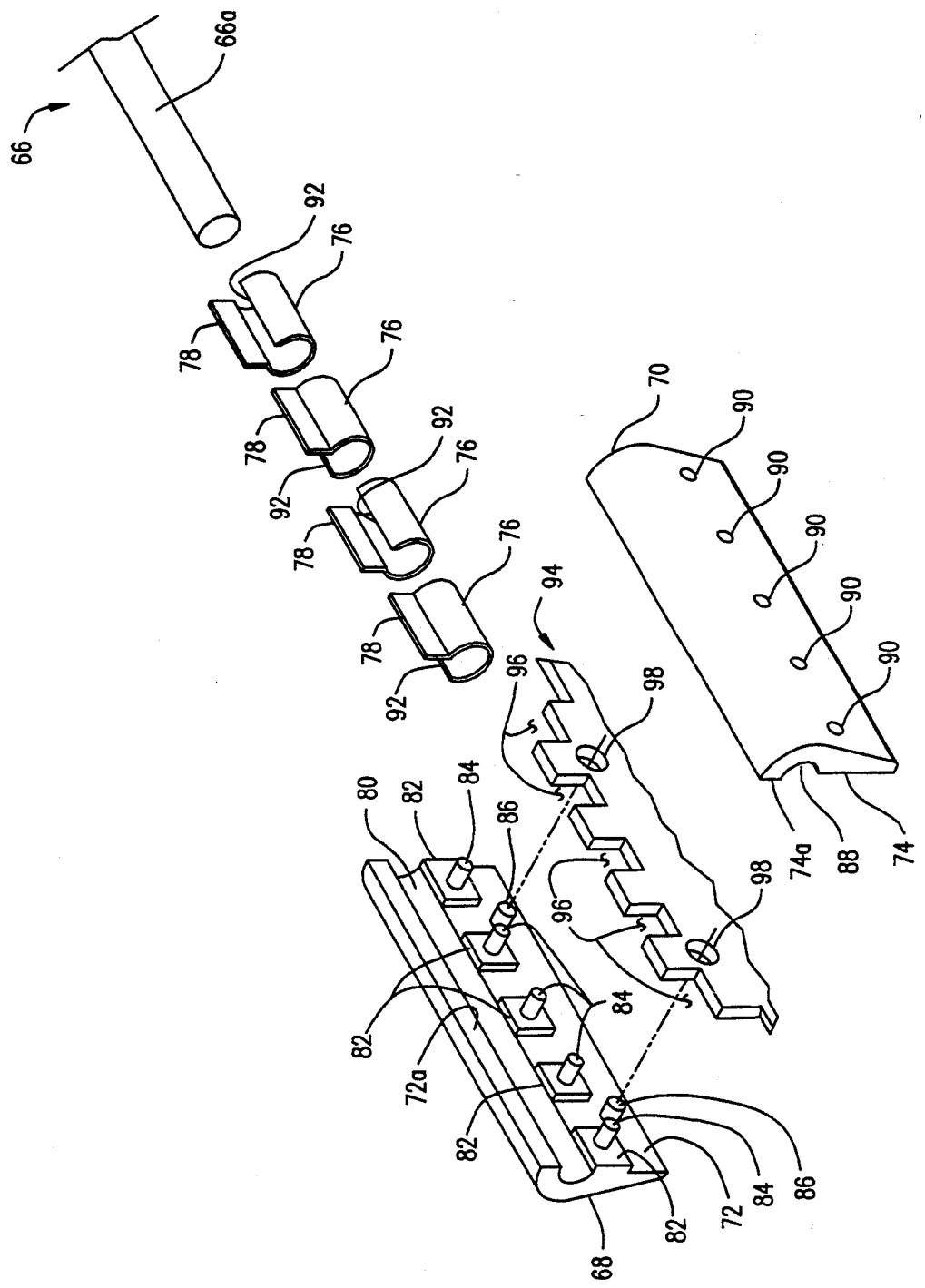
FIG. 5 is an enlarged scale exploded rear side perspective view of hinge pin and associated mounting portions of the I/O plate/lid hinge structure.

Referring now to FIGS. 3-5, the hinge portion of the combination I/O plate/lid hinge structure 34 includes a metal mounting structure subassembly 64, and a metal hinge pin 66 having a cylindrical inner end portion 66a and a flattened outer end portion 66b having a spaced pair of circular mounting holes 66c formed therethrough. Subassembly 64 comprises first and second clamping members 68,70 having facing, generally planar inner side surfaces 72 and 74, and a wrap spring clutch structure formed by four split tubular bearing members 76 (FIG. 5) having radially outwardly extending tab portions 78.

Clamping member 68 has a horizontally extending semicircular groove 80 formed in its inner side surface 72 below a top edge portion 72a thereof. Five rectangular bosses 82, each having an outwardly projecting cylindrical pin portion 84, are formed on the inner side surface 72 immediately below the semicircular groove 80 and above a horizontally spaced pair of cylindrical pins 86 projecting outwardly from the inner side surface 72.

Clamping member 70 has a horizontally extending semicircular groove 88 formed in its inner side surface 74 and being identical to the groove 80 formed in the clamping member 68. Groove 88 is positioned immediately below a top edge portion 74a of the inner side surface 74 and is spaced upwardly apart from a horizontally spaced series of five circular holes 90 formed through the clamping member 74. Holes 90 are configured and arranged to press fittingly receive the boss pins 84 on the clamping member 68 as subsequently described.

The metal hinge portion of the combination I/O plate/lid hinge structure 34 is assembled by extending the cylindrical inner end portion 66a of the hinge pin 66 through the four split tubular bearing members 76. As illustrated in FIG. 5, the longitudinal gaps 92 of axially successive ones of the bearing members 76 are on opposite sides of their radial tab portions 78. The bearing members 76 are then placed between the clamping member grooves 80,88 and the members 68,70 are fixedly pressed together on opposite sides of a support tab portion 94 of the I/O plate 36 (see FIGS. 3 and 5).

Support tab 94 has a horizontally elongated rectangular configuration, is positioned on the top side edge of the I/O plate 36 adjacent its end 44, and is rearwardly bent relative to the balance of the I/O plate. As best illustrated in FIG. 5, the support tab 94 has a horizontally spaced series of rectangular notches 96 formed in its side edge. Notches 96 are configured to complementarily receive the rectangular bosses 82 on the clamping member 68 and are positioned above a pair of circular holes 98 arranged and configured to complementarily receive the pins 86 on the clamping member 68.

To mount the hinge structure on the I/O plate tab 94, the clamping members 68,70 are positioned on opposite sides of the tab 94 with the bearing members 76, through which the cylindrical hinge pin portion 66a extends, being positioned between the semicircular clamping member grooves 80 and 88. The opposed clamping members 68,70 are then forcibly pressed together in a manner causing the bosses 82 to enter the tab notches 96, the pins 86 to enter the tab holes 98, the boss pins 84 to be press fitted into the holes 90 of the clamping member 70, and the bearing member tabs 78 to be pressed between the facing upper side edge portions 72a,74a of the clamping members 68,70.

This locks the mounting structure subassembly 64 to the I/O plate tab 94 as illustrated in FIG. 4, and radially compresses the bearing members 76 against the hinge pin portion 66a received therein to firmly support the hinge pin 66 and permit it to be pivoted relative to the bearing members 76 when a predetermined torque is applied to the hinge pin. As illustrated in FIG. 1, the lid housing 14 is secured to the flattened portion 66b of the hinge pin 66 by a pair of screws 100 extended through the hinge pin mounting holes 66c and threaded into a pair of holes 102 formed in a recessed area 104 formed in the rear side edge portion 28 of the lid housing 14 and configured to complementarily receive the flattened portion 66b of the hinge pin 66.

As can be readily seen, the metal combination I/O plate/lid hinge structure conveniently forms a direct grounding path from the lid housing 14 to the system planar board 18 (see FIG. 4). Additionally, the hinge structure is very firmly secured to the metal I/O plate instead of being screwed directly to the plastic base housing 12. Compared to conventional lid hinge construction, in which the hinge structure is screwed directly into a portion of the plastic base housing, this provides a substantially stronger hinge/base housing interconnection. Furthermore, the unique connection of the hinge structure to the I/O plate reduces the overall height required by the lid/base pivotal interconnection apparatus. In turn, this advantageously permits the vertical thickness of the computer 10 in its closed orientation to be reduced.

The foregoing detailed description is to be clearly understood as being given by way of illustration and example only, the spirit and scope of the present invention being limited solely by the appended claims.

What is claimed is:

1. A portable computer comprising:
   a base portion having disposed therein a system planar board, said base portion having a top side;
   an I/O plate member fixedly secured to said base portion;
   a lid portion; and
   electrically conductive hinge means, directly interconnected between said lid portion and said base portion, for securing said lid portion to said base portion for pivotal movement relative thereto between closed and open positions in which said lid portion respectively covers and uncovers said top side of said base portion,
   said lid portion being electrically grounded to said system planar board through said hinge means and said I/O plate member.

2. The portable computer of claim 1 wherein said hinge means include:
   a hinge pin member having first and second end portions,
   first means for pivotally supporting said first end portion of said hinge pin member on said I/O plate member, and
   second means for fixedly securing said second end portion of said hinge pin member to said lid portion.

3. The portable computer of claim 2 wherein:
   said I/O plate member has a tab portion formed on an edge thereof, and
   said first means include a mounting structure anchored to said tab portion and pivotally carrying said first end portion of said hinge pin member.

4. Hinge apparatus for pivotally securing a portable computer lid portion to an associated base portion having a back side, said hinge apparatus comprising:
   a metal I/O disposeable on the back side of the associated base portion;
   a metal hinge pin member having first anal second end portions;
   a metal mounting structure comprising;
     first means for anchoring said mounting structure directly to said I/O plate;
     second means for pivotally securing said first end portions of said hinge pin member to said mounting structure; and
     third means, associated with said metal hinge pin member, for anchoring said second end portion of said hinge pin member to the lid portion.

5. The hinge apparatus of claim 4 wherein said first means include:
   a tab portion formed on the metal I/O plate, and
   means for fixedly clamping said mounting structure to said tab portion.

6. The hinge apparatus of claim 5 wherein:
   the I/O plate has a top side edge portion and a rear side, and
   said tab portion is formed on said top side edge portion and is rearwardly bent relative to the balance of the I/O plate.

7. The hinge apparatus of claim 6 wherein:
   said second end portion of said hinge pin member is flattened and has a plurality of mounting holes formed therein, and
   said third means include a plurality of mounting screws extendable through said mounting holes and threadable into the lid portion.

8. For use with a portable computer having a base housing portion and a lid housing portion pivotally securable to the base housing portion, the base housing portion having disposed therein a system planar board with a plurality of I/O connector devices mounted thereon and disposed adjacent a back side of the base housing portion, the lid housing portion having a display semen on a side thereof, and a rear edge portion, a combination I/O plate/lid hinge structure comprising:
   an elongated metal I/0 plate having a longitudinally spaced plurality of cutout areas formed therein, said I/O plate being fixedly securable to the base housing portion in a manner such that portions of the I/O connector devices are receiveable in said cutout areas and said I/O plate is electrically grounded to the system planar board;
   a metal mounting structure anchored to said I/O plate; and
   a metal hinge pin having a first end portion pivotally carded by said mounting structure, and a second end portion anchorable to the rear edge portion of the lid housing portion.

9. The combination I/O plate/lid hinge structure of claim 8 wherein:
   said I/O plate has a top side edge portion, front and back sides, and a pair of opposite ends, and a connection tab portion formed on said top side edge portion, and
   said mounting structure is anchored to said connection tab portion.

10. The combination I/O plate/lid hinge structure of claim 9 wherein:
    said connection tab portion is upwardly and rearwardly angled relative to said top side edge portion of said I/O plate.

11. The combination I/O plate/lid hinge structure of claim 10 wherein:
    said connection tab portion is positioned adjacent one of said opposite ends of said I/O plate.

12. The combination I/O plate/lid hinge structure of claim 9 further comprising:
    a grounding tab projecting forwardly beyond said front side of said I/O plate and securable to the system planar board.

13. The combination I/O plate/lid hinge structure of claim 9 further comprising:

a mounting tab formed on a lower portion of said I/O plate and securable to the base housing.

14. A portable computer comprising:

a base housing portion having a top side with a keyboard thereon, and a back side;

a system planar board disposed within said base housing portion and having mounted thereon a plurality of I/O connector devices positioned adjacent said back side of said base housing portion;

a metal I/O plate disposed at said back side of said base housing portion and having cutout areas therein that receive portions of said I/O connector devices, said I/O plate being conductively secured to said I/O connector devices;

a lid housing portion having a rear side edge portion, and an inner side upon which a display screen is mounted; and hinge means for securing said lid housing portion to said base housing portion for pivotal movement relative thereto between a closed position in which said inner side of said lid housing portion extends generally parallel to and covers said top side of said base housing portion, and an open position in which said inner side of said lid housing portion is disposed generally transversely to said top side of said base housing portion to expose said display screen and said keyboard to a user of said computer, said hinge means including:

a metal mounting structure anchored to said I/O plate, and a metal hinge pin having a first end portion pivotally carried by said mounting structure, and a second end portion anchored to said rear side edge portion of said lid housing portion.

* * * * *